Nov. 3, 1964 M. L. HOOVER 3,155,942

METHOD AND APPARATUS FOR THREADING CORE MEMORY ARRAYS

Filed June 18, 1956 6 Sheets-Sheet 1

INVENTOR
Martin L. Hoover
By Earl Beust
Louis A. Kline
John J. Matlago
His Attorneys INVENTOR
Martin L. Hoover
By Earl Bennet, Louis A Kline, John J. Matlago
His Attorneys

METHOD AND APPARATUS FOR THREADING CORE MEMORY ARRAYS

Filed June 18, 1956 6 Sheets-Sheet 3

INVENTOR
Martin L. Hoover
By Earl Beust
Louis A Kline
John J. Matlago
His Attorneys

METHOD AND APPARATUS FOR THREADING CORE MEMORY ARRAYS

Filed June 18, 1956

INVENTOR
Martin L. Hoover
Earl Beust
By Louis A Kline
John J. Matlago
His Attorneys INVENTOR
Martin L. Hoover
By Earl Beust
Louis A Kline
John J. Matlago
His Attorneys Nov. 3, 1964 M. L. HOOVER 3,155,942

METHOD AND APPARATUS FOR THREADING CORE MEMORY ARRAYS

Filed June 18, 1956 6 Sheets-Sheet 6

INVENTOR
Martin L. Hoover
By Earl Bent
Louis A. Kline
John J. Matlago
His Attorneys 3,155,942

METHOD AND APPARATUS FOR THREADING CORE MEMORY ARRAYS

Martin L. Hoover, Downey, Calif., assignor to The National Cash Register Company, Dayton, Ohio, a corporation of Maryland Filed June 18, 1956, Ser. No. 592,087
6 Claims. (Cl. 340—174)

This invention relates to magnetic core memory arrays and more particularly to a novel means and method of threading and constructing such arrays.

Magnetic core memory arrays which are used for memory systems, as for example in digital computers, have been conventionally wound by a slow tedious hand-winding process. The cores are usually held by some suitable means in a fixed position on a flat plane in the form of an array, and the wires are threaded, using a hollow needle, through the rows and columns formed by the cores of the array. In order to enable threading wires in both directions, i.e., through the X and Y coordinate directions of the array, so as to enable, for example, each core to be selected for storing or reading out information, the cores are preferably held at an angle, resulting in a wire being directed through but a small area of the opening of each core in the line of cores being threaded. As a consequence, the wires have to be directed slowly by hand through the opening of each core. This process is not only tedious and time consuming, but is likely to cause errors of winding. Also, since the cores have to be positioned a certain distance apart to provide space for directing the wires and for handling the cores, an array threaded and constructed in this manner occupies a relatively large area.

Briefly, the apparatus of the preferred embodiment of this invention comprises a stack of circular discs rotatable about a common axis. Each of the discs is provided with a plurality of openings on the surface thereof in which magnetic cores can be positioned such that the openings thereof form columns whose axes are parallel to and equidistant from the axis of the stack of discs. This apparatus enables the sets of wires, representing the X coordinate selector, the Y coordinate selector, the sensing and the inhibit windings, for example, to be easily threaded through the cores of the stack, by rotating the respective rows of discs to form different columns of cores, depending on the path a particular wire is to take through the cores of the final array. The rotating of the discs for forming the columns to thread a particular array is easily accomplished since each disc contains a unique set of positioning holes through which an aligning rod can be inserted. These holes enable the cores to be accurately positioned and held in the desired alignment during the different steps of the wiring process.

Because the wires are always threaded through cores which are arranged in columns, this process enables a wire or hollow needle holding a wire to be directed transversely to the plane of individual cores whereby the entire core aperture of each core is available for passage of the needle therethrough. Since no space is required between cores to direct the wires and to handle the cores while threading, the cores can be closely positioned during the winding process. Further, since the column of aligned cores in the stack, so formed, presents a continuous, straight opening, the needle can be easily guided through each column of cores. Also, because of this close spacing of the cores, the wires only have to be threaded a short distance to pass through all of the cores.

It is, accordingly, an object of this invention to provide a novel means for facilitating the construction and threading of magnetic core memory arrays.

Another object of this invention is to provide a novel means and method for threading the cores in magnetic core memory arrays which enables the cores to be easily held and closely packed so as to minimize the space required for the finally assembled unit.

Another object of this invention is to provide a core array wiring apparatus which enables all of the cores of the array to be readily positioned such that the full opening of the core will be available for threading the several wires required in the system.

Another object of this invention is to provide a winding apparatus whose cores are contained on the surface of a plurality of rotatable discs arranged in a stack, with the wires being threaded from the ends of the stack of discs through various combinations of cores in the stack, and with each disc containing a unique set of positioning holes for use in aligning the cores of the different discs easily and accurately.

Another object of this invention is to provide a magnetic core memory array in which a large number of cores can be wound per inch of drive line, thus reducing the air inductance of the winding.

These and other objects of the invention as well as a better understanding and comprehension thereof can be obtained from the following description and drawings in which.

Figures 1, 2:
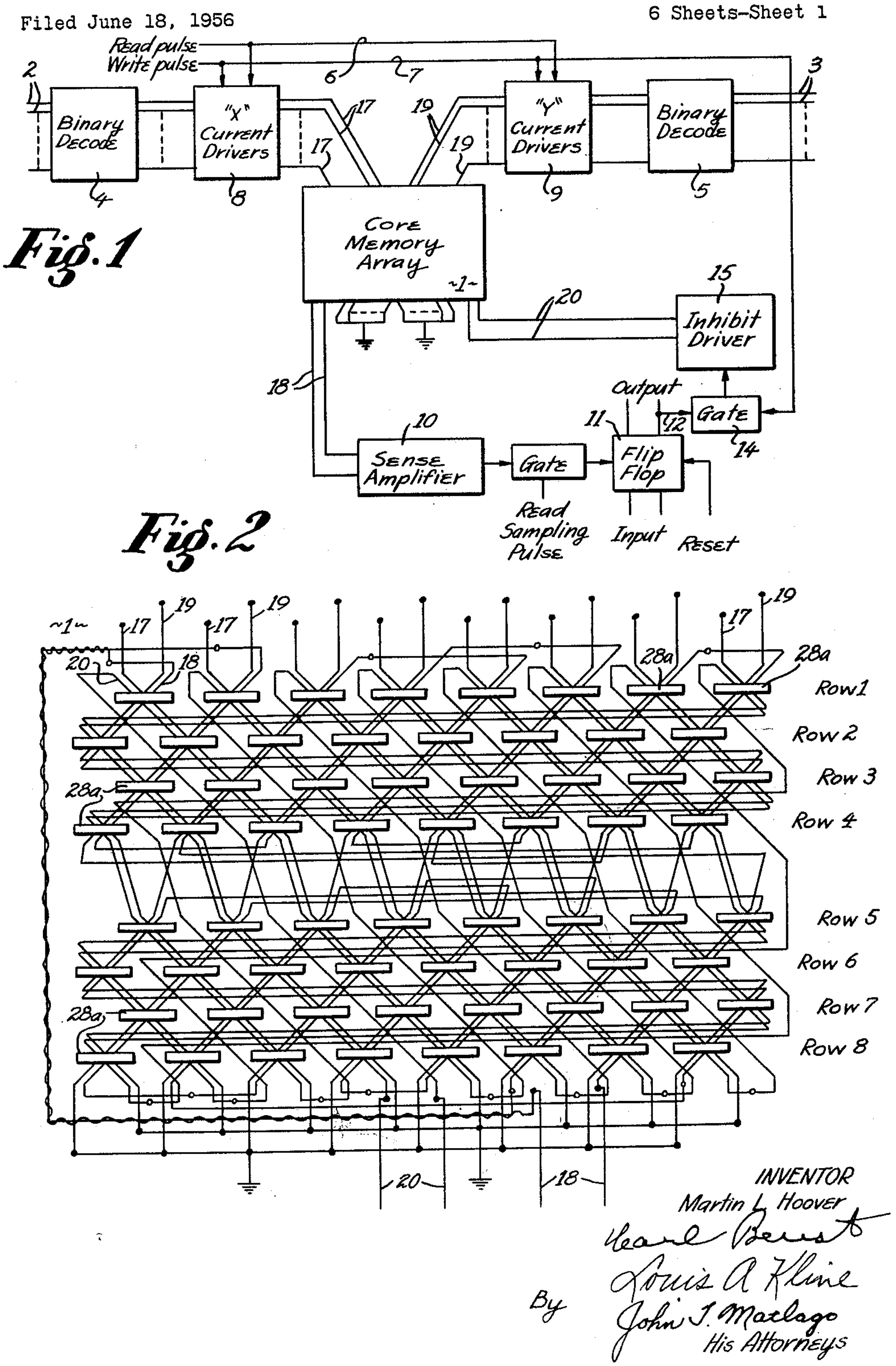
FIG. 1 is a schematic diagram of a magnetic core memory system.
FIG. 2 is a schematic diagram of a core memory array showing how the cores are threaded to operate in the system shown in FIG. 1.

Reference will first be made to FIG. 1, showing a diagram of a core memory array 1 with its associated electrical circuitry, as is well known in the prior art.

The X and Y coordinate address signals received by the address lines 2 and 3 are directed into the binary decoding units 4 and 5, respectively. These signals, after being decoded, enable pulses received on read and write leads 6 and 7 to energize the X and Y current drivers 8 and 9 to supply pulses to a selected one of X drive lines 17 and a selected one of Y drive lines 19 of memory array 1 during the reading and restoring phases of the memory cycle operation. Since the memory array 1 is wound so that each combination of the set of X and Y drive lines 17 and 19 cross in only one selected core of the array 1, the current pulses on this combination are additive in only this one core. The sum of these two currents is sufficient to drive this selected core into an opposite residual state of magnetic flux.

In operating the memory, if the core selected to be interrogated, by a read pulse received on line 6, is storing a binary "one," a signal is induced on a sense line 18, which is threaded through all the cores of the array 1. This output signal is sensed by the sense amplifier 10 and gated to trigger flip-flop 11 so that the output of its zero output line 12 is low in potential, a condition which closes gate 14 connected to the input of inhibit driver 15. Therefore, a write pulse, which is received on lead 7 during the restoring phase of the cycle operation, is prevented from energizing the inhibit driver 15 to pass an inhibit pulse through to an inhibit line 20, which also is threaded through all the cores **28*a* (see FIG. 2) of the array 1. As a consequence, the write pulse applied to the same core through the selected one of X drive lines 17 and the selected one of Y drive lines 19 is able to restore the selected core 28*a* to its original binary "one" state. The signal on the sense line 18 is not observed during this restoring phase of the memory cycle. It should be understood, of course, that if the selected core 28*a* of the array 1 is storing a binary zero, no signal is read out of the sense line 18 since the core does not change state. Under this condition the write pulse on lead 7 passes through gate 14, thus generating an inhibit pulse on inhibit line 20**, causing the core to remain in a zero status during the restoring phase of the cycle operation.

It is thus seen that the cores of the memory array 1, for the system shown in FIG. 1, must be properly threaded with four types of lines, e.g., the two sets of X and Y drive lines 17 and 19, respectively, the sense line 18, and the inhibit line 20.

Reference will next be made to FIG. 2, showing a detailed wiring diagram of the completed memory array 1 of this invention, which is ready for installation into the system of FIG. 1. This is a diagram of the cores of the memory array of this invention removed from around its circular winding apparatus (FIG. 3) onto a flat plane for purposes of illustration. The array comprises eight rows of cores, with eight cores in each row. It is clear from the diagram of FIG. 2 that the wires of the array are not threaded through the cores **28*a* in a straight forward fashion, thus clearly revealing that the conventional method of threading cores, which involves threading them while in a fixed position, is time consuming and tedious. It should be noted, for example, that the sets of X and Y coordinate drive lines 17 and 19, respectively, must be threaded through the array so that each pair of drive lines 17 and 19 selects, i.e., crosses through, only one core 28*a* of the array. Further, the sense line 18 and the inhibit line 20 must pass through all the cores 28*a* of the array. In this embodiment, the threading of the sense line 18 is further complicated since it is separately directed through the cores of the upper and lower halves of the array 1** as shown.

It should be noted that drive lines 17 cross sense line 18 at right angles in each core **28*a* in order to eliminate undesired signals from being induced in sense line 18 from air core flux coupling with drive lines 17. If the sense line 18 and drive lines 17 did not cross at right angles, a read current pulse in a selected drive line 17 would induce a signal in sense line 18. These signals could cause, when a core 28*a*** being interrogated is in the zero state, a readout signal of sufficient amplitude to cause an error by being sensed in the flip-flop (FIG. 1) as a "one."

It should further be noted that the sense line 18 and drive line 19 are parallel to each other in each of the wired rows of cores **28*a* comprising the two halves of the array 1. Therefore, a read current pulse on a selected drive line 19 will induce signals in sense line 18 from air core flux coupling between the two lines such that the induced signals in the sense line 18 linking the cores of rows 1 to 4, inclusive, of the array 1 will be of an amplitude to cancel the induced signal in the sense line 18 linking the cores of rows 5 to 8, inclusive. Therefore, these undesired signals do not affect the amplitude of the readout signals from the selected core 28*a***, a condition which could cause a reading error.

Figures 3, 4, 5, 6, 7:
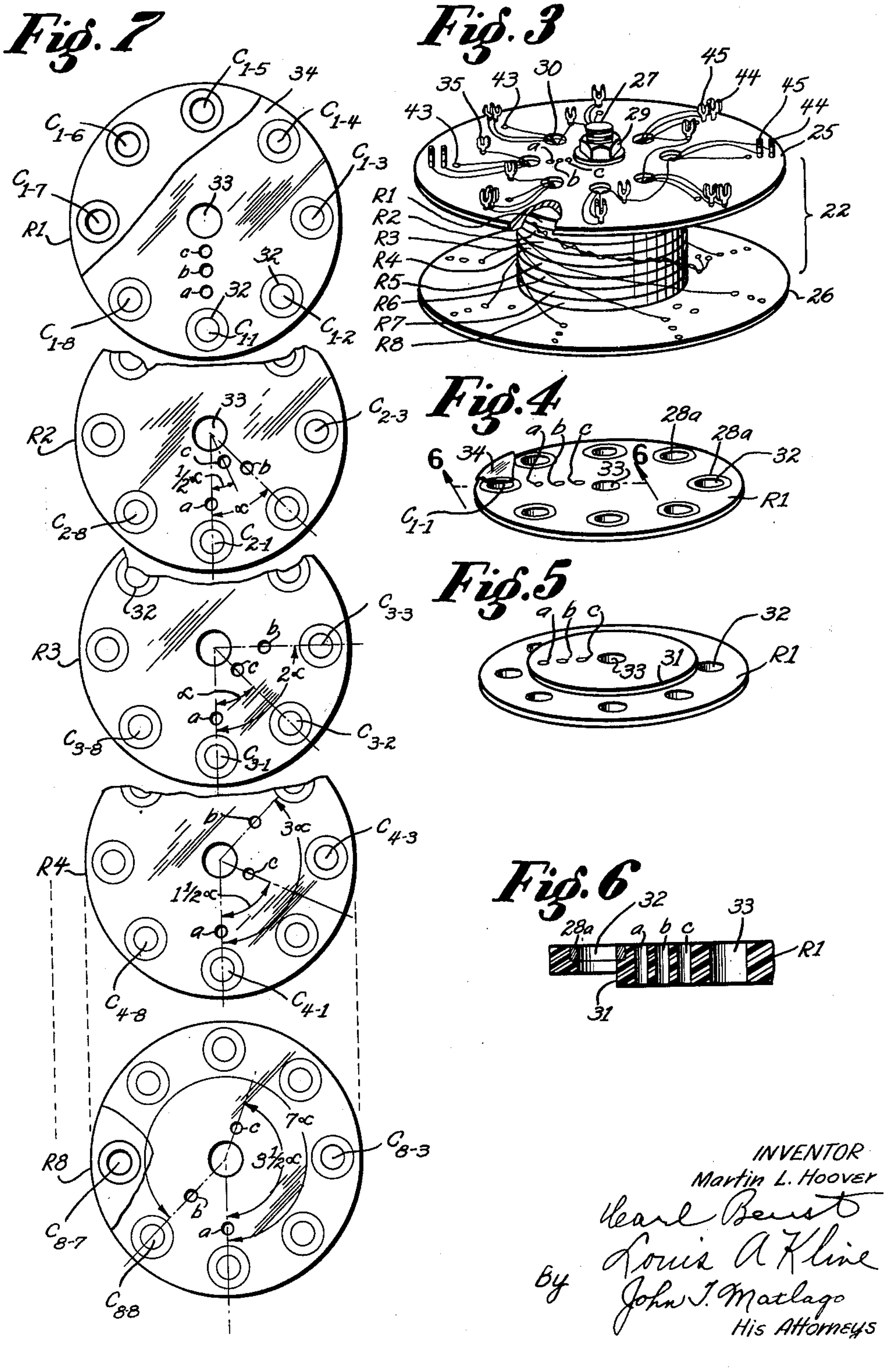
FIG. 3 is a perspective view of the completed magnetic core memory array unit of the present invention.
FIG. 4 is a top perspective view of a disc employed for holding the cores.
FIG. 5 is a bottom perspective view of the disc.
FIG. 6 is a sectional view taken on line 6—6 of FIG. 4.
FIG. 7 is a top plan view of the discs comprising a stack, showing the location of the holes used for aligning the cores during the threading operation.

For a description of the apparatus utilized to carry out the process of winding the memory array 1, refer next to FIG. 3, which shows a perspective view of a cylindrically arranged magnetic core memory unit 22, this being the preferred embodiment. This memory unit 22 is ready for installation into the memory system of FIG. 1. The core memory array 1, which was described in FIG. 2, is contained within the novel winding apparatus comprising unit 22. This apparatus comprises eight axially aligned discs R1, R2, etc. positioned to form a cylindrical stack. Circular terminal plates 25 and 26 are respectively positioned at the top and bottom of the stack of discs, in the view shown. An axial bolt 27, passing through the central openings of the assembled discs and terminal plates, is provided with a nut 29 on each end thereof which holds the assembly together. Each of the terminal plates 25 and 26 contain terminals, such as terminal 35, for connecting the wires threading the columns of the cores **28*a* of the array 1 to each other and to the external electrical circuits shown in the completed system of FIG. 1. The circular terminal plates 25 and 26 contain eight equally spaced holes 30 which are aligned with the columns of holes formed by openings provided in the stack of discs R1, R2**, etc.

The discs of the apparatus of unit 22 will next be described in detail. FIG. 4 is a top perspective view, and FIG. 5 is a bottom perspective view of one of the discs R1 of the stack. This disc, which is constructed of a suitable non-magnetic material, such as acrylic plastic, has one flat side, as shown in FIG. 4, and one side containing spacing shoulder 31, as shown in FIG. 5. Eight holes 32 are equally spaced about the surface of disc R1, all an equal distance from the axis of central opening 33. These holes are counterbored to hold magnetic cores **28*a*, as best shown in FIG. 6, which is a sectional view taken along line 6—6 of FIG. 4. Disc R1** also is provided with positioning holes *a*, *b*, and *c*, which will be described in detail later. As can be seen in FIG. 5, spacing shoulder 31 is of a diameter large enough to include the positioning holes *a*, *b*, *c*. This shoulder 31 serves to hold the cores apart to provide space between cores of adjacent discs for the winding.

Referring back to FIG. 4, during assembly, a magnetic core **28*a* is placed in each of the holes 32 of the discs by, for example, covering the disc R1 with cores 28*a* such that one core falls into each of the holes 32, and then brushing off the excess cores. To hold the cores 28*a* in position in the holes 32 of each of the discs R1, R2, etc., during threading of unit 22, a retaining sheet 34, which is some light material such as tissue paper, is glued onto the top surface of the plastic disc R1** by some suitable retaining material such as phenol.

Referring now to FIG. 7, the discs R1, R2, etc., as stacked in memory unit 22, will be further described. As previously noted, the preferred embodiment of unit 22 has eight discs R1, R2, etc., with eight holes 32 provided near the outer surface of each disc, as already described in FIG. 4. When the discs are filled with cores **28*a*, stacked together, and properly threaded with wires, the wired combination of cores so formed provides a memory array 1**, as shown in the diagram of the completed array in FIG. 2.

In the assembled unit 22, each of the discs R1, R2, etc. can be individualy rotated about the axis of bolt 27, and the cores **28*a*** are positioned thereon at equal angles and at the same radial distance from the axis of rotation. This allows aligning of the cores into eight columns, as viewed through the eight holes 30 in terminal plate 25, each including one core from each of the eight discs, and then rotating the discs until the cores are again aligned into eight different columns, each including another desired combination of one core from each disc. By threading wires through the columns containing one combination of cores and then, after rotating the discs, threading wires through columns containing another combination of cores, the wires can be made to easily pass through the cores of the completed array, as shown in FIG. 2.

Since the eight holes 32 of each disc, R1, R2, etc., containing cores 28*a*, are spaced at equal angles about the center of a disc, the angle $\alpha$ between two adjacent holes 32 of the preferred embodiment is 45°. In order to clearly show how the discs R1, R2, etc. are positioned during the steps of the winding process, the eight holes 32 for each disc are given distinguishing reference notations. Thus the lower hole in disc R1, as shown in FIG. 7, is designated $C_{1-1}$, the next hole in the counterclockwise direction is $C_{1-2}$, the next $C_{1-3}$, etc. The first number of this subscript defines the position of the disc in the stack, and the second number defines the position of the hole about the surface of the disc. The holes 32 in the remaining discs are similarly designated, employing the same notation.

It should be noted that the linear distance between the rows of cores 28*a* on the assembled unit 22 is dependent on the size of the spacing shoulder 31 on the discs, as best shown in FIG. 5. It should be further noted that the discs R1, R2, etc. of the memory unit 22 are each finally rotated so that the cores 28*a* of each disc of the stack are staggered in relation to the cores 28*a* of adjacent discs, that is, the cores 28*a* of each row are spaced half way in between the cores 28*a* in the adjacent rows, as shown in FIG. 2. It is this latter arrangement, together with the provision of the proper size of shoulder 31 that ensures the sets of drive lines 17 and 19 will cross each other in each core 28*a* at right angles.

The location of the positioning holes *a, b,* and *c* in each of the discs R1, R2, etc. will now be described. These holes are used to aid in positioning each of the discs of the stack so that the columns will contain the desired combination of cores 28*a* during the different steps of the winding process. As noted, each of the discs R1, R2, etc. differs from the other in the arrangement of the positioning holes *a, b,* and *c*. Thus the holes *a, b,* and *c* for disc R1 are all aligned along the same disc radius as that defined for hole $C_{1-1}$. The hole *a* is located in the same position, i.e., hole *a* is aligned with holes $C_{2-1}$, $C_{3-1}$, $C_{4-1}$ . . . $C_{8-1}$, for the remaining discs R2, R3, R4, . . . R8, respectively. The discs R1, R2, etc. are positioned with an aligning rod 37 through holes *a* (see FIG. 8) when it is desired to form the column of cores 28*a* for inserting wires which are to be parallel to each other in one coordinate direction of the completed array of FIG. 2.

The hole *b*, which, as stated, is aligned along the disc radius defined for hole $C_{1-1}$ of disc R1, is aligned with hole $C_{2-2}$ for disc R2, with hole $C_{3-3}$ for disc R3, etc. That is, hole *b* is displaced an angle $\alpha$ in a counterclockwise direction on each successive disc of the stack.

Rotating each of the discs R2, R3, etc. in a clockwise direction relative to disc R1, when viewed from the top of the stack, enables all the discs to be aligned with the aligning rod 37 through holes *b* (see FIG. 14) to form the column of cores 28*a* into which windings are inserted which are to be parallel to each other in the other coordinate direction of the completed array of FIG. 2.

Viewed from the top of the stack of discs, hole *c*, which is also aligned with hole $C_{1-1}$ of disc R1, is at an angle of $\frac{1}{2}\alpha$ thereto in a counterclockwise direction, on disc R2, and advances an angle of $\frac{1}{2}\alpha$ on each successive disc such that on disc R8 it is positioned at an angle of $3\frac{1}{2}\alpha$ from its position on disc R1. Rotating all discs in a direction opposite (clockwise) to the first rotation such that aligning rod 37 can be inserted through all holes *c* (see FIG. 16), enables the cores 28*a* in the successive discs to be staggered such that the two sets of coordinate windings, which have been previously inserted, cross each other at 90° angles in the final array, as seen in FIG. 2.

Having described the apparatus comprising the memory unit 22, the winding process using this apparatus will now be described by referring first to FIG. 8, which is a perspective view of the winding apparatus during step I of the winding process with parts broken away and with the discs and terminal plates spaced from each other for clarity.

Figure 8:
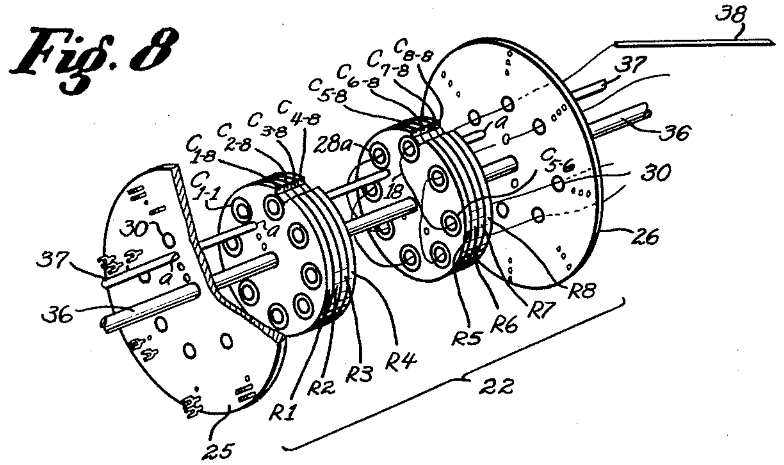
FIG. 8 is a perspective view of the winding apparatus as utilized during step I of the winding process.

Preparatory to carrying out the winding of step I, the eight discs R1, R2, etc. are assembled on an axial rod or spindle 36 to form two groups of four discs each, R1–R4 and R5–R8, respectively, as shown in FIG. 8, with the flat side of each disc facing the front, in the view shown. Terminal plate 25 is then mounted on axial rod 36 at the front end of the stack of discs, and terminal plate 26 is mounted on rod 36 at the back of the stack. As previously noted, these terminal plates have terminal holes 30 which correspond to the position of the holes, such as holes $C_{1-1}$, . . . $C_{1-8}$, in the discs. Also terminal plate 25 has positioning holes *a, b,* and *c* which correspond in location to those of the first disc R1, and terminal plate 26 has positioning holes *a, b,* and *c* corresponding to the location of those in the last disc R8 (FIG. 7). In order to align all cores into columns for step I of the winding process, an aligning rod 37 is inserted through all the holes *a* of the terminal plate 25, the discs R1, R2, etc., and the terminal plate 26. The apparatus is now ready for the winding of sense line 18.

Referring to disc R5, which is the top disc of the rear group of discs shown, a length of sense line 18 is threaded through alternate columns of cores, for example, the column including hole $C_{5-8}$ and the column including hole $C_{5-6}$, by the use of hollow needle 38. The loops formed by the four lengths of sense line 18 spanning alternate columns of the rear group of discs are held tight against the surface of disc R5 by pulling on the ends of the loops extending out of holes 30 of terminal plate 26. These ends are left unconnected and with sufficient excess length to allow for extension of their paths through the cores as a result of rotation of the discs later in the process.

Figure 9:
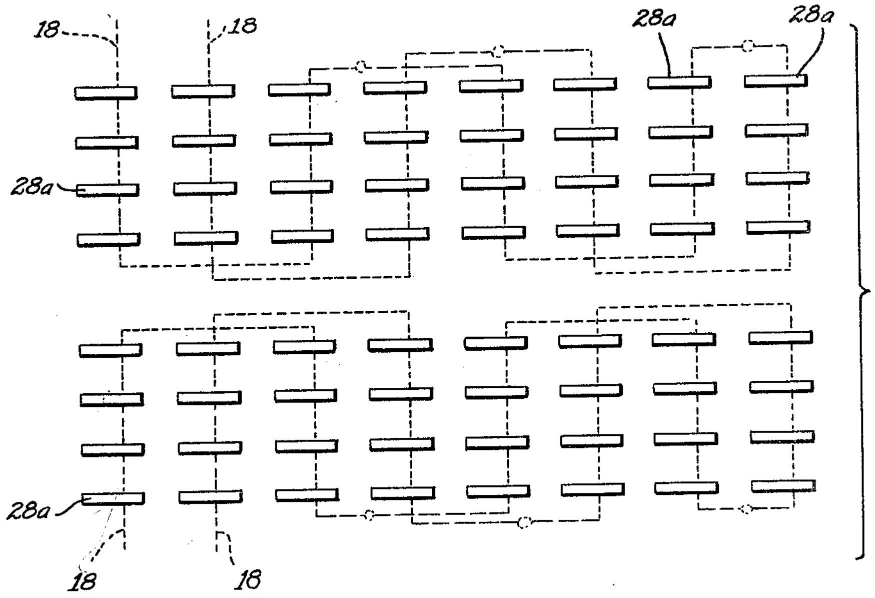
FIG. 9 is a schematic wiring diagram showing how the cores positioned on the discs of the stack are wound upon completion of step I of the winding process.

Reference will next be made to FIG. 9, showing a schematic diagram of the cores 28*a* removed from around the apparatus onto a flat plane for purposes of illustration.

This diagram clearly shows that in each group of the discs, the lengths of sense line 18 are threaded so that when the ends of the loops of a group are connected together, one unbroken line is formed which passes down through one column, spans across the next adjacent column, and passes up through the following column, continuing in this manner until all columns of a group have been threaded. This enables the ends of the portion of the sense line of one group to be connected external to the stack to the ends of the portion of the sense line of the other group to finally form one continuous sense line 18. This method of winding serves to cancel any induced currents in sense line 18 resulting from energizing a drive line 19 which passes through the array in a direction parallel to the sense line.

The second group of cores are similarly wound by the sense line 18, as shown, to complete step I of the winding process.

Figure 10:
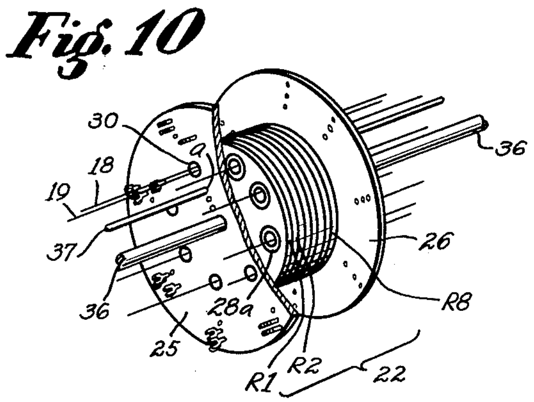
FIG. 10 is a perspective view of the winding apparatus as utilized during step II of the winding process.
Figure 11:
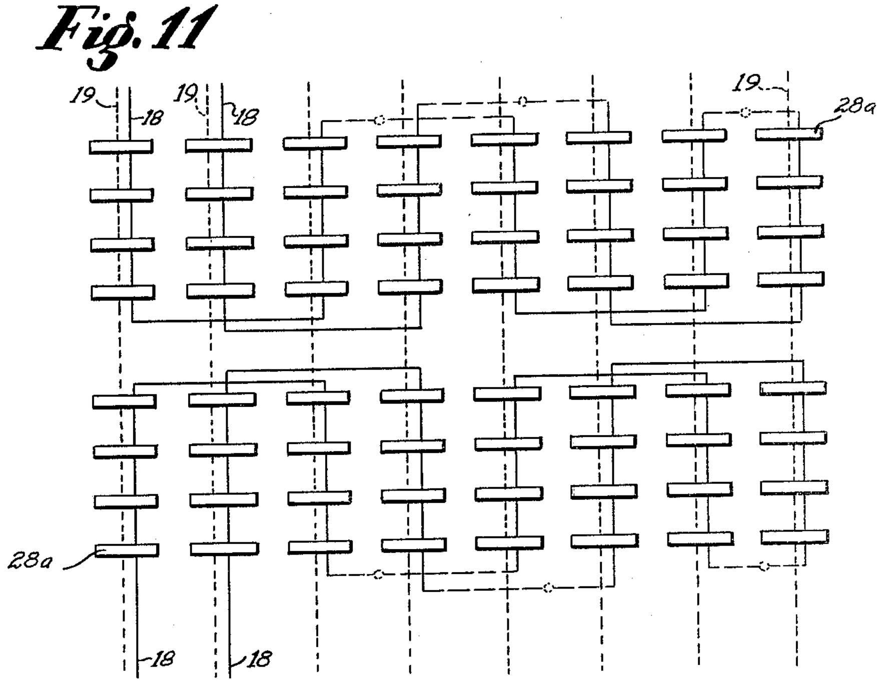
FIG. 11 is a schematic wiring diagram showing how the cores positioned on the discs of the stack are wound upon completion of step II of the winding process.

Refer next to FIG. 10, which is a perspective view of the winding apparatus for the threading of the wires during step II. The two groups of discs with the sense line 18 threaded through the cores 28*a* thereof have now been pushed together on axial rod 36. Aligning rod 37, which was inserted through holes *a* in step I, maintains the discs and therefore cores 28*a* of the apparatus in alignment. The apparatus is now ready for threading of drive line 19, which is accomplished by inserting the hollow needle 38 (FIG. 8) containing a length of wire through each of the columns of cores. The ends of each length of wire passing out of the apparatus through holes 30 of terminal plates 25 and 26 are left unconnected so that the path of the wire through the apparatus can be extended when rotating the discs, during later steps of the process. Refer now to FIG. 11, which is a schematic diagram showing the wiring of the cores 28*a* after step II of the threading process is completed. The lengths of wire, representing drive lines 19, passing through each column of cores is shown as a dashed line, for clarity. The sense line 18 and drive lines 19 are the wires which pass in one direction through the completed array of FIG. 2.

Figure 12:
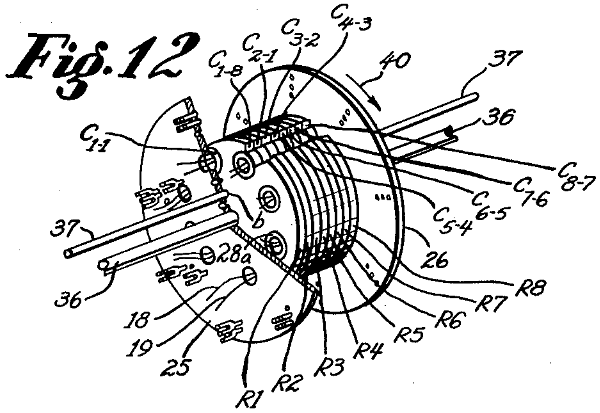
FIG. 12 is a perspective view of the winding apparatus as utilized during step III of the winding process.

For step III of the process, refer to FIG. 12 which is a perspective view of the winding apparatus showing how the discs R1, R2, etc. are rotated to a position for threading the remaining wires through the cores. Each of the discs must be rotated relative to the next so that the cores 28*a* will be now aligned in columns for threading the wires which pass through the completed array of FIG. 2 in the direction at right angles to that of the wires previously wound. This can be accomplished by rotating all of the discs such that aligning rod 37 will pass through all holes *b* of terminal plate 25, discs R1 to R8, and terminal plate 26. Thus, after withdrawing aligning rod 37 from hole *a* of the stack, it is first inserted through hole *b* of terminal plate 25 and disc R1, and then disc R2 is rotated about axial rod 36 until aligning rod 37 can be inserted through hole *b* of that disc. The direction of rotation is in the clockwise direction, as indicated by arrow 40. Disc R3 is next rotated in the same direction until aligning rod 37 can be inserted through hole *b* of this disc. This procedure is continued until aligning rod 37 is inserted through holes *b* of all of the discs and terminal plate 26.

The discs R1 to R8, inclusive, have now been rotated so that their respective holes (see FIG. 7) $C_{1-8}$, $C_{2-1}$, $C_{3-2}$, $C_{4-3}$, $C_{5-4}$, $C_{6-5}$, $C_{7-6}$, and $C_{8-7}$ are aligned to form a single column of holes, as shown in FIG. 12.

Figure 13:
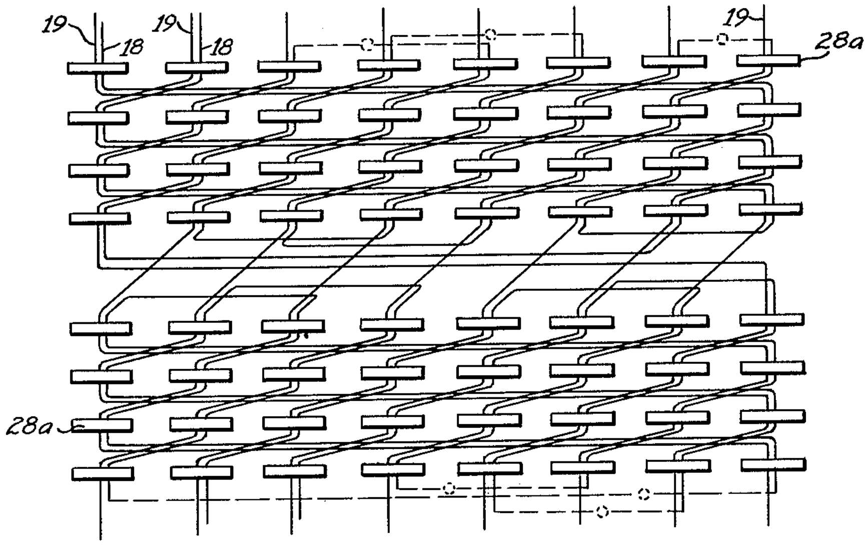
FIG. 13 is a schematic wiring diagram showing how the cores positioned on the discs of the stack are wound upon completion of step III of the winding process.

For a description of the path of the windings in the array at the end of step III of the process, i.e., after aligning rod 37 has been inserted, refer to FIG. 13 which is a schematic diagram of the wiring of the cores 28*a* removed from around the apparatus onto a flat plane for purposes of illustration. The sense line 18 and the drive line 19, which were previously threaded through columns of the cores 28*a* of the stack, now generally follow a path in the array, directed downward to the left, in a clockwise direction.

Figure 14:
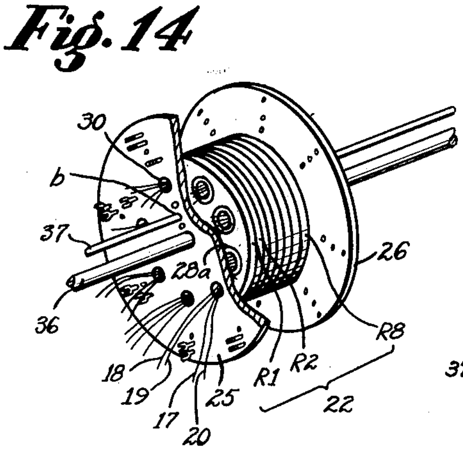
FIG. 14 is a perspective view of the winding apparatus as utilized during step IV of the winding process.

For step IV of the process, reference will be made to FIG. 14 showing a perspective view of the apparatus of memory unit 22 after threading of the remaining wires of the array. It should be noted that the discs are in the same position as that shown for FIG. 12. During this step IV, separate lengths of wires, representing the drive lines 17 and the inhibit line 20, are inserted through each of the eight columns of cores by use of the hollow needle 38 (FIG. 8). The ends of the wires extending out of openings 30 in terminal plates 25 and 26 are left unconnected so that excess wire is available when the path through the cores is lengthened during the final step of the process.

Figure 15:
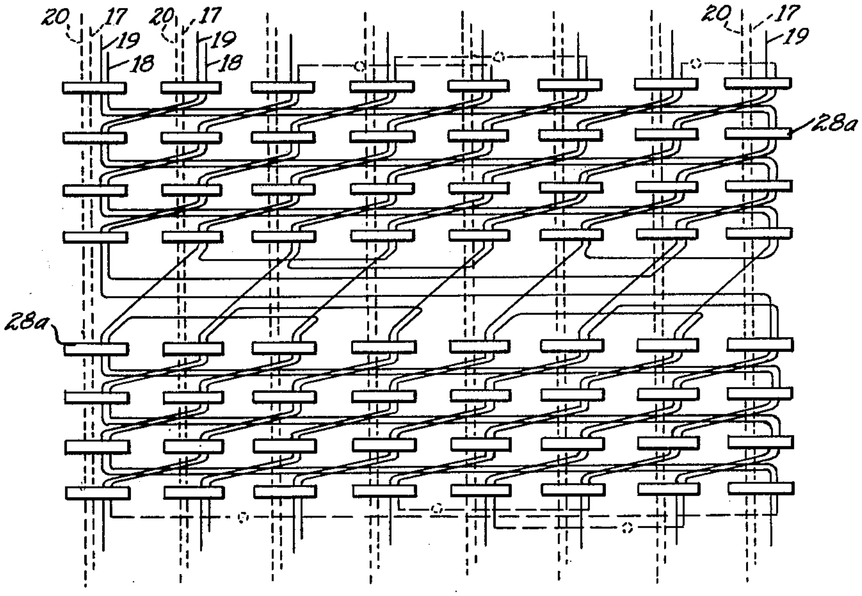
FIG. 15 is a schematic wiring diagram showing how the cores positioned on the discs of the stack are wound upon completion of step IV of the winding process.

Refer now to FIG. 15 which is a diagram of the cores 28*a* removed from around the stack of discs in FIG. 4 and flattended onto a plane for purposes of illustration. This diagram shows the drive lines 17 and inhibit lines 20, dashed for clarity, inserted through each column of cores. This step completes the insertion of all of the wires which are contained in the completed memory array 1.

Figure 16:
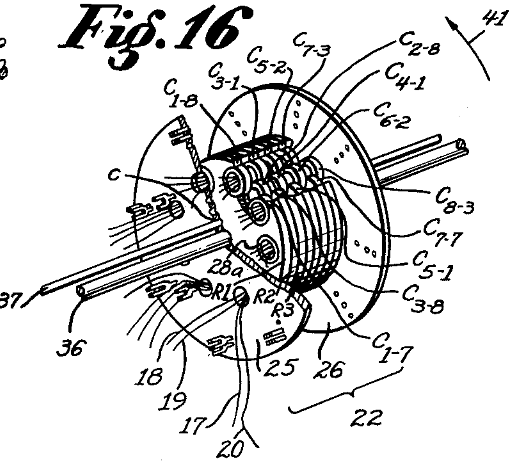
FIG. 16 is a perspective view of the winding apparatus as utilized during step V of the winding process.

For step V of the winding process, refer next to FIG. 16 which is a persepctive view of the winding apparatus with parts broken away, to show how the discs are finally positioned in the stack. As seen in FIG. 15, all of the threading of wires was completed in step IV but the X drive line 17 and the sense line 18 do not cross each other at 90° angles in each of the cores 28*a*, a condition which is desired when winding arrays, in order to prevent induced current in the sense line. In order for the wires running in two directions through the array to cross each other at 90° angles in the cores, another series of rotations is required. Aligning rod 37 is removed from hole *b* in which it was positioned during step IV and inserted in holes *c* of terminal plate 25 and disc R1, the holes of these two being in a corresponding position. Disc R2 is then rotated until hole *c* thereof is aligned with hole *c* of disc R1 such that rod 37 can be inserted therethrough. The direction of rotation is indicated by arrow 41, this direction being in a counterclockwise direction when viewing the stack from the terminal plate 25. Disc R3 is then rotated in the same direction until rod 37 can be inserted through hole *c* of that disc, this procedure being continued until rod 37 is finally inserted through hole *c* of disc R8 and terminal plate 26. Drive line 19 and sense line 18 now have slack wire between the discs of the stack which is taken up by pulling on the ends of each of these wires extending out of the holes 30 in terminal plates 25 and 26.

It is now clear from FIG. 16 that the discs R1, R2, etc. have been rotated relative to each other such that the cores in each row of the stack are staggered relative to the cores in the adjacent rows. Thus note that the core in position $C_{2-8}$ of disc R2 is spaced midway between the cores in positions $C_{1-8}$ and $C_{1-7}$ of the upper adjacent disc R1, and midway between the cores in positions $C_{3-1}$ and $C_{3-8}$ of the lower adjacent disc R3.

The array is now complete except for connecting the wires and soldering them to the terminals of terminal plates 25 and 26. Before connecting the wires, the axial rod 36 is removed from the apparatus and replaced by axial bolt 27, as can be seen in FIG. 3. As also can be seen in FIG. 3, mounting nuts 29 are tightened against a washer on axial bolt 27 to hold the discs permanently in their final position. Aligning rod 37 can now be also removed from the stack.

Reference should next be made back to FIG. 2 which is the diagram of the completed memory array 1, as contained in the memory unit 22 shown in FIG. 16. This diagram clearly shows how the sense line 18, the drive lines 17 and 19, and the inhibit line 20 are threaded through the cores 28*a*. Reference should also be made to FIG. 3 which shows the memory unit 22 with the wiring to the terminal plates 25 and 26 completed.

Referring in particular to sense line 18, the loops thereof are connected to form a single continuous line threading all the cores 28*a* of the array, as previously described in connection with FIG. 9. It should be further noted in FIGS. 2 and 3 that the ends of the portion of the sense line 18 extending out of the upper group of cores have been twisted together and connected to form a continuous line with the portion of the sense line 18 extending out of the lower group of cores. The ends of this continuous sense line 18 are now available for connecting to sense amplifier 10 (FIG. 1). It should next be noted that the drive line 17 is now at right angles to sense line 18, and drive line 19 is now parallel to sense line 18, because of the manner in which the wires were threaded through the cores and the discs were rotated. Further, each of the drive lines 17 have been connected to a terminal 44, and each of the drive lines 19 have been connected to a terminal 45 on terminal plate 25. These drive lines have been similarly connected to terminals on terminal plate 26. The drive line terminals on plate 25 are now ready for connection to the X and Y drive current drivers of FIG. 1 while the drive line terminals on plate 26 are grounded. The terminal plate 25 is also provided with holes 43 through which the individual lengths of inhibit line 20 have been passed to enable them to loop back through similar holes in terminal plate 26. In this manner the inhibit line 20 forms a single continuous lead through all the cores 28$a$ of the array. The ends of inhibit line 20 are now available for connecting to inhibit driver 15, as shown in FIG. 1.

The manual process of winding the magnetic core memory unit 22 allows fast and simple winding of arrays by following the exact and well-defined steps of the winding process as described. These same steps are easily adaptable to automatic operation by introducing the winding apparatus into a suitable machine which would carry out all the steps of the process. It should be obvious that this invention is also applicable to winding arrays which contain combinations of wires other than the 4 wire system described.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for use in the fabrication of a magnetic core array comprising: a stack of axially aligned non-magnetic discs, each disc provided with equally spaced openings on the surface thereof located at the same distance from the axis of the stack; a core positioned in each of the openings of said discs, said discs capable of being individually rotated about the axis of the stack such that the cores thereon are aligned to form columns; and means including positioning holes having a different arrangement in each said disc for aiding in rotatably positioning each disc about the axis of said stack so as to form columns comprised of different combinations of cores through which the wires of the array can be threaded.

2. Apparatus for use in the fabrication of a magnetic core array comprising: a stack of axially aligned non-magnetic discs, each disc provided with equally spaced openings on the surface thereof located at the same distance from the axis of the stack; an axial rod extending through the stack; a toroidal magnetic core positioned in each of the openings of said discs, said discs capable of being individually rotated about said axial rod such that the cores thereon form columns parallel to the axis of the stack; an aligning rod; and positioning means including a different arrangement of positioning holes in each said disc, each disc having positioning holes at predesignated radial distances from said axis in which said aligning rod can be directed to rotationally position the discs about the axis of said stack to form columns comprised of different combinations of cores through which the wires of the array can be threaded.

3. Apparatus for use in the fabrication of a magnetic core memory array comprising: a stack of discs, each disc provided with equally spaced openings on the surface thereof located at the same distance from the axis of the stack; a core positioned in each of the openings of said discs, said discs being individually rotatable with respect to the axis of the stack such that the cores thereon can be aligned to form columns parallel to the axis of the stack; a first positioning hole in said discs located at a first radial distance from said axis for aligning the cores to form columns for threading wires to be directed in one direction through said array; a second positioning hole in said discs located at a second radial distance from said axis for aligning the cores to form columns for threading wires to be directed in the other direction through said array; and a third positioning hole in said discs located at a third radial distance from said axis for aligning the cores such that cores in each discs are positioned midway between the cores of adjacent discs.

4. Apparatus for use in the fabrication of a magnetic core array comprising a stack of non-magnetic discs having openings therein adapted each to receive a toroidal magnetic core, the discs being adapted to be individually rotatable with respect to the axis of the stack and the openings being so located as to permit individual ones thereof in each disc to be aligned columnwise parallel with said axis to allow wires to be threaded through the cores, the discs being further adapted to be subsequently individually rotatable with respect to the axis of the stack to effect relative displacement of the individual cores so as to arrange the latter in a predetermined pattern relative to one another, and means for controlling the rotational displacement of individual discs relatively to one another including positioning holes formed in each disc at different radial distances from said axis, the successive alignment of corresponding radially disposed positioning holes of the discs acting, also, to align different combinations of core-containing openings through which wires may be threaded in accordance with a predetermined wiring pattern.

5. Apparatus for use in the fabrication of a magnetic core array comprising a stack of non-magnetic discs having openings therein adapted each to receive a toroidal magnetic core, the discs being individually rotatable with respect to the axis of the stack and the openings being so located as to permit individual ones thereof in each disc to be aligned columnwise parallel with said axis to allow wires to be threaded through the cores, each of said discs being provided with first, second and third positioning holes, each located at a different radial distance from said axis, the alignment of a predesignated first one of said holes in each disc serving to align predetermined openings in the discs so as to form columns of cores through which wires may be threaded in one co-ordinate direction through the array, the alignment of a second positioning hole in each disc serving to align further openings so as to form columns of cores through which wires may be threaded in the other co-ordinate direction, and the alignment of the third positioning hole in each disc serving to displace the discs such that the openings in each disc of the stack are positioned midway between adjacent ones of the openings in the succeeding disc.

6. Apparatus for use in the fabrication of a core array comprising: a stack of plate-like members having openings therein, each opening being adapted to receive a core, said members being individually rotatable with respect to the axis of said stack, and said openings being so located as to permit individual ones thereof in each member to be aligned columnwise parallel with said axis to allow lines to be threaded through said openings; and positioning means including holes having a differently spaced arrangement in each of said members for aiding in rotatably positioning each of said members about the axis of said stack in accordance with a predetermined threading pattern.

References Cited in the file of this patent

UNITED STATES PATENTS

| | | |
|---|---|---|
| 2,700,150 | Wales | Jan. 18, 1955 |
| 2,752,537 | Wolfe | June 26, 1956 |
| 2,770,796 | Boer | Nov. 13, 1956 |
| 2,771,663 | Henry | Nov. 27, 1956 |
| 2,786,682 | McManus | Mar. 26, 1957 |
| 2,800,705 | Ingalls et al. | July 30, 1957 |
| 2,814,792 | Lamy | Nov. 26, 1957 |
| 2,871,547 | Huggins | Feb. 3, 1959 |
| 2,890,390 | Goodwin | June 9, 1959 |